United States Patent [19]
Kelly

[11] 3,822,554
[45] July 9, 1974

[54] HEAT ENGINE
[76] Inventor: Frederick Griffin Kelly, 2 Viking Rd., Dalkeith, Australia 6009
[22] Filed: June 19, 1973
[21] Appl. No.: 371,519

[30] Foreign Application Priority Data
June 26, 1972 Australia............................ 9461/72

[52] U.S. Cl. ............................................... 60/655
[51] Int. Cl. ............................................ F01k 23/02
[58] Field of Search ..................................... 60/655

[56] References Cited
UNITED STATES PATENTS
2,802,114  8/1957  Artsay................. 60/36 X
3,625,817  12/1971  Anderson............ 60/38 X Primary Examiner—Edgar W. Geoghegan
Assistant Examiner—Allen M. Ostrager
Attorney, Agent, or Firm—Donald D. Jeffrey

[57] ABSTRACT

A heat engine operating between temperatures T1 (low) and T2 (high) includes separate vapour closed-cycle motor and pump systems, in heat-exchange relation at T1 and T2, and means for heat-exchange between the condensates of said systems.

9 Claims, 1 Drawing Figure

PATENTED JUL 9 1974 3,822,554
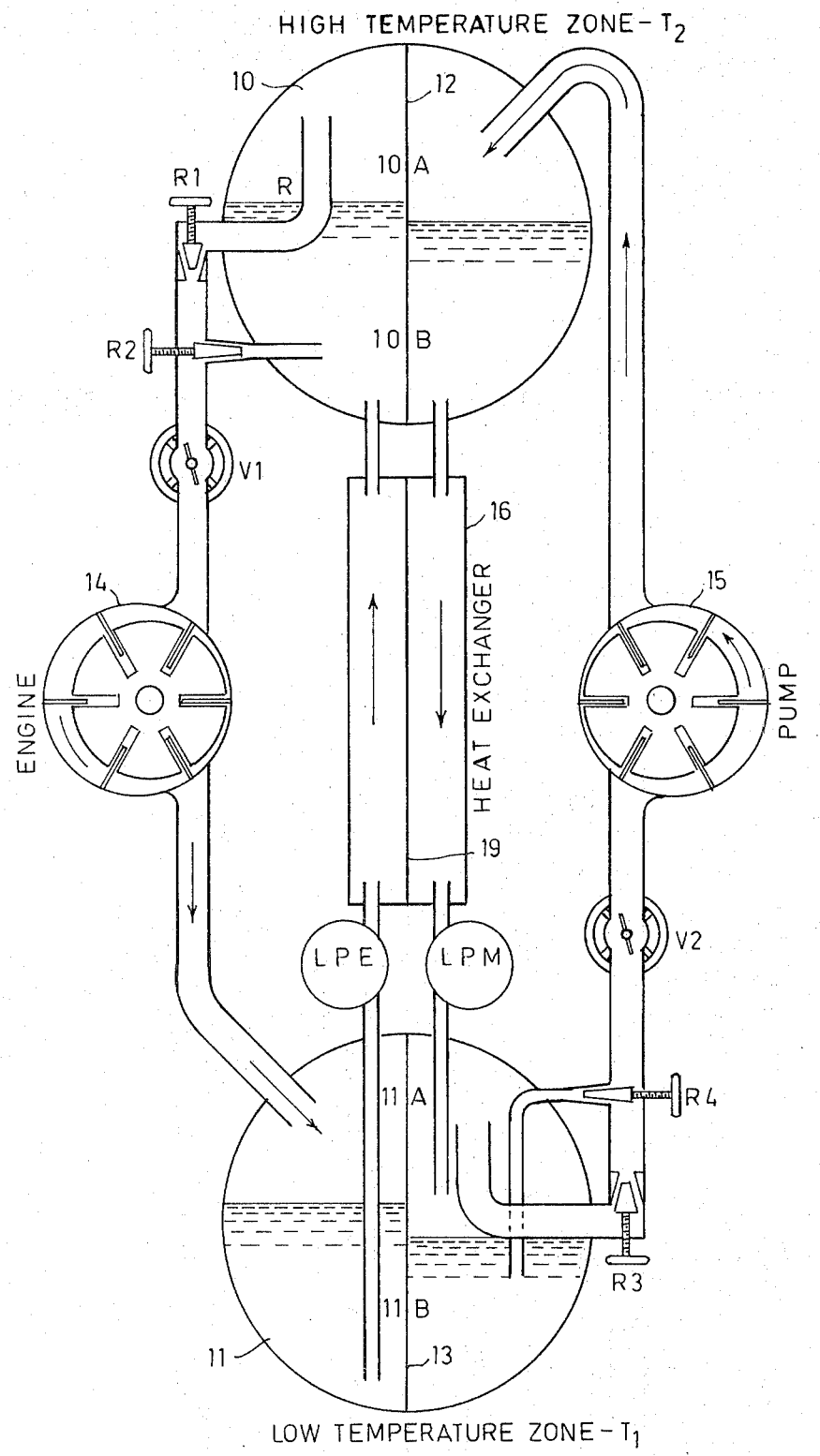

HEAT ENGINE

According to the conventional theory of heat engines, the theoretical maximum conversion efficiency of a heat engine cannot exceed $(T_2 - T_1) / T_2$ (the carnot ratio) where $T_2$ is the absolute temperature at which heat is put into the engine and $T_1$ the absolute temperature of the exhaust. The Carnot ratio implies that a portion of the heat put into the engine must be discarded at temperature $T_1$.

It is an object of this invention to construct an engine free of the Carnot limitations of efficiency, and in which no substantial heat is discarded at temperature $T_1$.

A further object is to enable low temperature sources of heat energy, such as solar, atmospheric, sea water, exhaust steam, etc., to be converted to work at high efficiencies, where the Carnot formula limits efficiency owing to the low temperature range. Another object is to reduce waste heat polution.

A heat engine may be used to lift heat from $T_1$ to $T_2$ by having mechanical energy drive it backwards, but the ratio of heat lifted to work put in is the inverse of the Carnot ratio. Therefore a heat engine and a heat pump working together have zero theoretical net work and net heat. This rule holds no matter what substances are used. Actually, there are friction and heat leakages resulting in this combination absorbing work.

Primarily, the engine of the invention includes a first closed cycle vapour system operating a motor, a second separate closed cycle vapour system operated by a heat pump and using a different operating fluid bath operating between temperatures $T_1$ (low) and $T_2$ (high), and heat exchangers between the two systems in the $T_1$ and $T_2$ regions, and between their condensates using a liquid heat exchanger.

In order that the principles of the invention may be better understood, reference is made to the accompanying drawing, which shows in purely diagrammatic form an engine according to the invention.

There is a high temperature zone, $T_2$, represented by the circle 10 and a low temperature zone, $T_1$, represented by the circle 11, with vapour in parts 10A, 11A and liquid in parts 10B, 11B. An engine 14 and a heat pump 15 work in unison and their input and output fluids are in intimate heat exchange at zones 10, 11 and a counter-flow heat exchanger 16. In zone 10 partition 12 represents a heat exchanger between the engine and pump fluids and vapours, and in zone partition 13 represents a similar exhcanger. The $T_1$ condensate of the engine circuit is returned from zone 11 to zone 10 by a small liquid pump LPE, and the condensate of the pump circuit is returned from zone 10 to zone 11 by the liquid motor LPM. These liquids exchange their heats in counter-flow through the heat exchange represented at 19. The engine 14 and heat pump 15 are on the same shaft, or geared together or otherwise coupled to work in unison. The fluid pump and motor, LPE and LPM may be regulated in speed by conventional methods not described, to maintain liquid levels in zones 10 and 11. Valves R1, R2 and valves R3, R4 may be adjusted to control liquid levels at T2 in the motor system and at T1 in the pump system.

A thermodynamic analysis of a particular example will now be given. In this example, the working fluids are ethane and sulphur dioxide. In this calculation heat will be eventually (see below) assumed supplied to the complex around zone 10 (the $T_2$ zone), and no heat will be descarded or absorbed at zone 11, (the $T_1$ zone).

Definitions of terms to be used in the following calculations:

BTU: British thermal unit.
T: Temperature in Fahrenheit degrees (F).
$H_L$ : Enthalpy per pound of liquid above an arbitrary temperature level specified.
$H_e$ : Enthalpy per pound, of the heat of evaporation of a liquid.
$H_V$ : Enthalpy per pound, of the heat content of saturated vapour; $H_V = H_L + H_e$
$S_L$ : Entropy per pound of a liquid, above an arbitrary level.
$S_e$ : Entropy of evaporation of one pound of a liquid at a given temperature, the evaporated vapour being assumed saturated, or in quilibrium with the liquid from which it is evaporating.
$S_V$ : Entropy per pound of the heat content of a saturated vapour; $S_V = S_L + S_e$.
P : Pressure in pounds per square inch above absolute zero or PSIA.
W : Work in BTU equivalents, where 1 BTU equals 778 foot pounds of mechanical work.

The temperatures chosen to be used in the example are 100° F and 0°F. Thermodynamic data for ethane is available in Barkelaw, Valentine and Hurd: "Transactions American Institute of Chemical Engineers" Vol. 43, Page 25 (1947), and data for $SO_2$ in the same Journal Vol. 41 page 265 (1945) - Rynning and Hurd.

CALCULATIONS

Calculations are begun with 1 pound of ethane at 100° F, which is slightly above its critical temperature of 90.1°, and at a pressure of 1,500 psia. Critical temperature for a liquid-vapour substance is defined at that above which the substance is neither a liquid nor vapour in its physical behavior, but a compressible substance.

This one pound of ethane is fed from zone 10, to the engine in FIG. 1, valve $R_1$ being closed. From the tables, the entropy is 1.3407 and enthalpy 326.8. On being expanded and exhausted by the engine 14 at 0°F, 219.7 psia, it has been cooled and some vapour evolved but no heat was absorbed nor given out during the expansion. This is known as constant entropy expansion, the entropy in this case being 1.3407 at the beginning and the end of expansion. Entropy is made up of 2 parts: entropy of the liquid, $S_L$ and entropy of vaporisation, $S_e$. The vapour after expansion has an entropy of $1.3407 - 1.2132 = 0.1275$, where 1.2132 is the entropy of 1 pound of liquid at 0°. The entropy of evaporation is at 0° $= 1.5476 - 1.2132 = 0.3344$. Hence the pounds of vapour after expansion are $0.1275/0.3344 = 0.3813$. The liquid heat at 0° is 250.3 BTU. Evaporation heat at 0° is $403.9 - 250.3 = 153.6$ BTU per pound. For 0.3813 pound it is $0.3813 \times 153.6 = 58.6$ BTU. The total heat is liquid plus evaporation or $250.3 + 58.6 = 308.9$ BTU. This is less than the 326.8 BTU heat when the 1 pound entered the engine. The difference is 17.9 BTU. Since the enthalpy of the liquid at 0° includes the equivalent of the work required for pump LPE to pump the liquid back to zone 10, the 17.9 BTU is the net work done by the engine per pound of ethane through it.

The same treatment will now be given to 1 pound of $SO_2$, fed into the engine as liquid at 100° since its critical temperature is above 100° F. Its entropy is 0.1443 and enthalpy 65.3. On expansion it partly vapourises, the weight fraction of vapour being (0.1443 − 0.0797)/(0.4503 − 0.0797) = 0.1743. The heat content at end of expansion and when exhausted at the 0° pressure is 1743 × 170.3 + 32.5 = 62.2 BTU. The heat loss is 65.3 − 62.2 = 3.1 BTU, which is the net work by the engine for 1 pound of $SO_2$ liquid from 100° to 0°.

So far the choice of whether the ethane or the $SO_2$ should serve in the engine and which in the pump has not been determined. Neither has the decision to which zone, $T_1$ or $T_2$, the heat will be supplied.

CASE I

In this case heat will be supplied to zone $T_1$ at zero degrees and no heat will be discarded or absorbed at zone $T_2$, at 100°. Since both substances are fluids at $T_2$ this condition will be met if each enters and leaves with the same heat content. This means that the liquid pumped up LPE must be heated to temperature $T_2$ by the down-flowing pump liquid in exchanger 19. So the counterflow heat loss by the pump liquid between $T_2$ and $T_1$ must be equal to or greater than the gain in heat by the engine liquid. The liquid heat content change between $T_1$ and $T_2$ temperatures will be designated $H_{L1} - H_{L2}$.

Heat content change of the 1 pound of ethane, liquid at 0° to fluid at 100°, is 326.8 − 250.3 = 76.5 BTU. For 1 pound of $SO_2$ it is 65.3 − 32.5 = 32.8 BTU. For equal $H_{L2} - H_{L1}$ for these substances 76.5/32.8 = 2.33 pounds of $SO_2$ per pound of ethane is required. The work for 2.33 pounds of $SO_2$ is 2.33 × 3.1 = 7.22 BTU. For the 1 pound of ethane it is 17.9 BTU. So we choose the ethane for the engine 14 circuit and the $SO_2$ for the pump 15 circuit, with which the complex delivers 17.9 − 7.22 = 10.68 BTU net work while discarding no heat.

The engine complex described has a disadvantage not suffered by conventional engines, namely that it requires two engines and three heat exchanges instead of an engine and fluid pump. For the preceding example engine capacity of 17.9 + 7.22 = 25.12 BTU is required for 10.68 BTU work. This gives an engine usage of 10.68/25.12 = 0.425 or 42.5 percent of installed capacity. Therefore the invention may save enough in fuel costs to pay for extra engine capacity and heat exchangers.

CASE II

Heat will be supplied to zone $T_2$ at 100° and no heat will be discarded or absorbed at $T_1$ at 0°. Therefore the heat deposited by the engine substance at $T_1$, which is the condensation heat of its expansion vapour, must equal the evaporation heat of the pump fluid to be compressed to liquid at $T_2$, plus any liquid heat if the pump liquid arrives at $T_1$ above 0°.

Assuming that the fluid pumped by LPE down to zone $T_1$ arrives at temperature 0°, the condensation heat of the ethane vapour must equal the evaporation heat of the $SO_2$. To accomplish this, the rates of flow must be 58.57/29.7 = 1.973 pounds of $SO_2$ per pound of ethane. The net work zone by the complex is then 17.9 − 1.973 × 3.1 = 11.78 BTU and the engine usage is 11.78/(17.9 + 6.12) = 0.49 or 49%. Note that this is higher than when heat was put in at the 0° zones. The higher the temperature of the heat supplied the greater the work output.

To illustrate that this engine complex is suitable for other pairs of substances in other temperature ranges, a pair consisting of water at 800° F and 5,000 psia (well above critical conditions of 705.4° and 3,206.2 psia) and mercury operating between 800° and 696°, when flowed in a ratio that results in no heat loss or gain at 696°, give 100 percent theoretical efficiency and 34 percent engine usage. Another pair, carbon dioxide and sulphur dioxide at 87.8° working between that and 0° F, gives 100 percent theorectical efficiency and 27 percent engine usage.

The engine usage percentages quoted for the above pairs are not necessarily the highest possible. The engineering thermodynamic data published for them does not go extensively enough into the super critical region relevant to my usage. Previous usage in engines has normally not worked in these regions. Furthermore, only a miniscule of the hundreds of substances available and likely, have data published. Therefore a program of selection of substances with likely properties and measuring and tabulating their properties in the desired regions, may yield many suitable pairs, in all likelihood with engine usages 50 to 65 percent.

Speed and torque of the complex can be controlled by the two inlet valves $V_1$ and $V_2$ in the inlets of the engine and pump. Starting of the complex would occur if zones 10 and 11 were at a substantial temperature difference, or it could be accomplished by mechanical cranking.

In the ethane - $SO_2$ system described, the ethane is above critical temperature at T2, and the $SO_2$ below it.

A similar desirable effect may be attained by choossing an operating fluid for the motor system which has a liquid specific heat rising in the range T1 − T2 more than that of the pump circuit operating fluid.

It will therefore be seen that the operating fluids usable in motor and pump systems may vary widely.

What I claim is:

1. A heat engine including;
   a first closed-cycle liquid vapour system operating a motor using a first operating fluid;
   a second separate liquid-vapour system operated by a heat pump using a second operating fluid different from said first fluid;
   both systems operating between a low temperature T1 region and a high temperature T2 region;
   first and second heat-exchangers between said first and second systems in the T1 and T2 temperature regions;
   a third heat-exchanger between the condensates in said two systems; and
   means for applying heat to one said region;
   the relative amounts and the nature of the operating fluids in said systems being such that heat is substantially neighter absorbed nor discarded in the other said region.

2. An engine as claimed in claim 1, in which said engine and said pump are coupled to work in unison.

3. An engine as claimed in claim 1, including valves leading from the vapour area and the liquid area in region T2 of said first system to the input of said motor to control the liquid level, and valves from the vapour area and the liquid area in region T1 to the input of said pump to control the liquid level.

4. An engine as claimed in claim 1, in which the critical temperature of said first operating fluid is below temperature T2 and the critical temperature of said second operating fluid is above temperature T2.

5. An engine as claimed in claim 1, in which the liquid specific heat of said first operating fluid rises in the temperature range T1 to T2 more than the liquid specific heat of said second operating fluid.

6. An engine as claimed in claim 1, in which said one region is the T2 region and said other region is the T1 region.

7. An engine as claimed in claim 1, in which said one region is the T1 region and said other region is the T2 region.

8. An engine as claimed in claim 1, in which condensate from said first system in the T1 region is pumped to the T2 region through said third heat-exchanger and condensate in said second system in the T2 region is passed via said third heat-exchanger to a liquid motor and thence to the T1 region.

9. An engine as claimed in claim 1, including a control valve on the inlet of the motor in said first system and a control valve on the inlet of the pump in said second system.

* * * * *